UNITED STATES PATENT OFFICE.

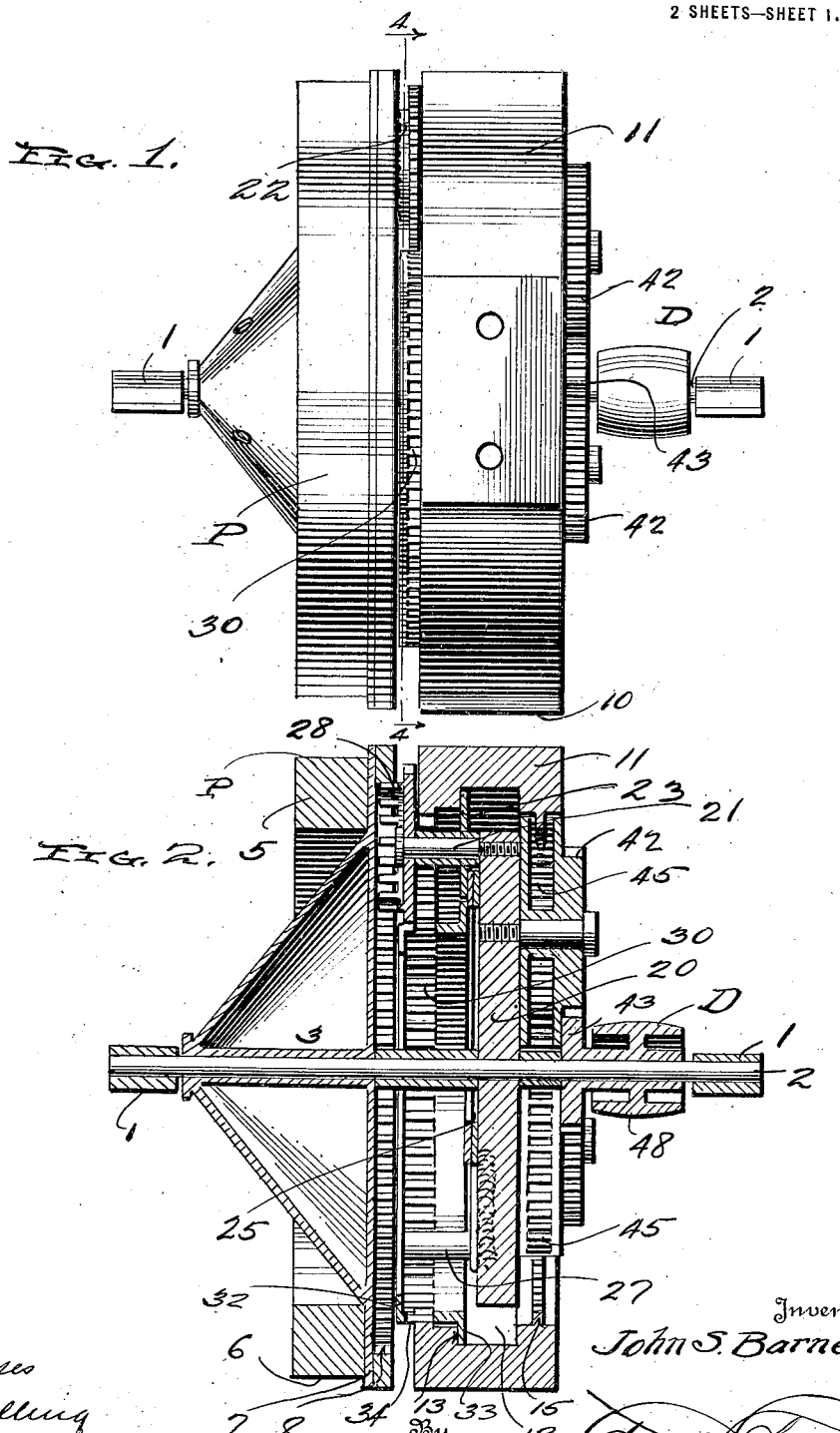

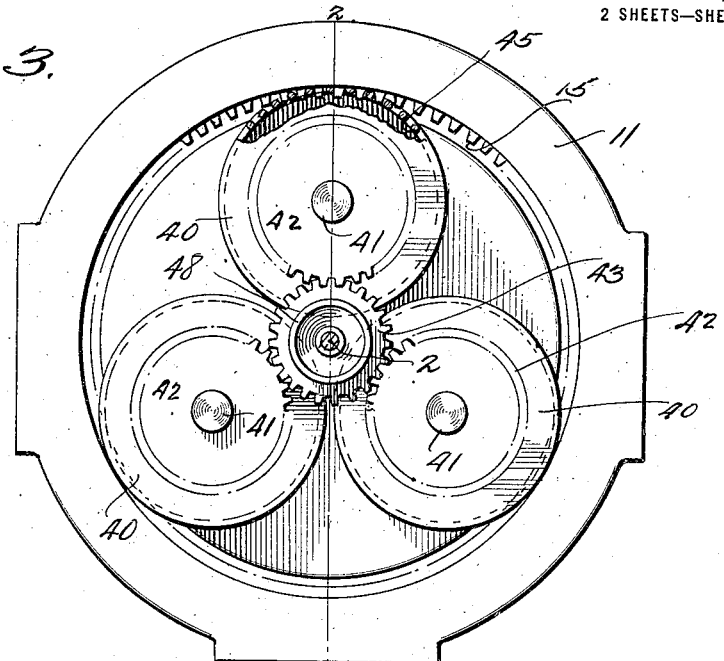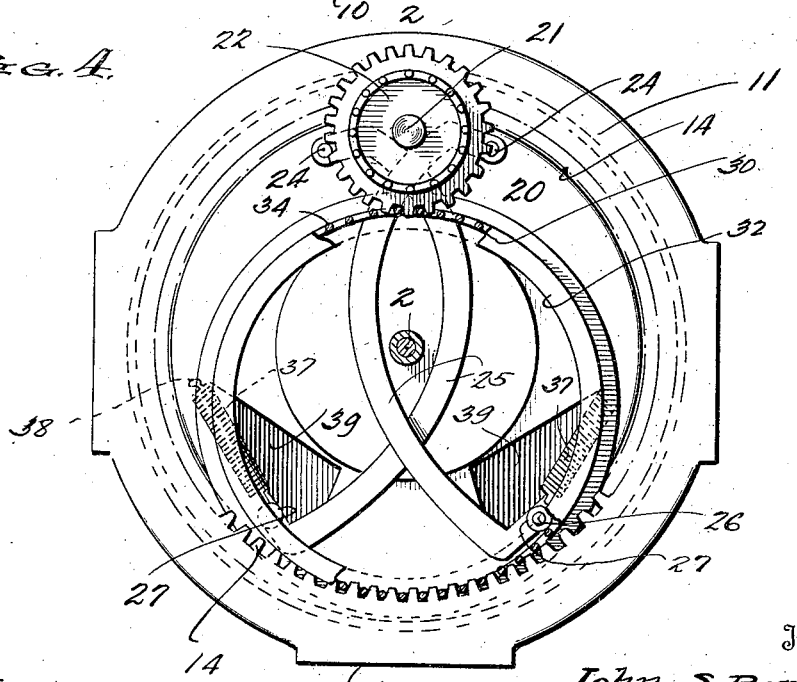

JOHN S. BARNETT, OF NORTH BEND, OREGON.

PLANETARY GEARING.

1,376,915. Specification of Letters Patent. Patented May 3, 1921.

Application filed March 2, 1920. Serial No. 362,721.

*To all whom it may concern:*

Be it known that I, JOHN S. BARNETT, a citizen of the United States, residing at North Bend, in the county of Coos, State of Oregon, have invented certain new and useful Improvements in Planetary Gearing; and I do hereby declare the following to be a full, clear, and exact description of the invention, such as will enable others skilled in the art to which it appertains to make and use the same.

The primary object of this invention is to produce a structure wholly contained within a substantially cylindrical casing or drum fixed in position alongside a power wheel, these parts and the driven wheel being all coaxial and mounted on a common shaft or axle.

The structure is small and compact, and all parts are housed excepting the driven wheel and the idlers which drive it, thus rendering it possible to substitute a driven wheel of different size, or to replace both the driven wheel and idlers in order to secure a variation in speed and therefore in power.

The principle on which the apparatus operates is that of a rotating disk having an internal gear engaged by teeth on a floating or ring gear smaller than said internal gear and eccentrically disposed therein, and a planetary or revolving pinion mounted on a stub shaft carried by the disk and located within the crescent between the internal gear and the gear ring, conveying power to the latter from the power wheel and rotating constantly on its own axis as is revolves with the disk. In carrying out this general idea, details of construction are employed which are set forth below. One successful embodiment of the invention is shown in the accompanying drawings in which:

Figure 1 is a side elevation.

Fig. 2 is a vertical section, being taken on about the line 2—2 of Fig. 3.

Fig. 3 is a rear elevation, looking from the right in Fig. 1.

Fig. 4 is a vertical section on the line 4—4 of Fig. 1.

The structure shown in the drawings is described below as intended to convey power from a power wheel P at what is herein called the front of the machine, to a driven wheel D at the rear. However, either or both these wheels could be gears instead of pulleys as shown, the power might be applied to the wheel D in which case the wheel P would be the driven element and rotated at a lower rate of speed, the main shaft or axle might be fast within the power element and driven by any suitable means such as a crank, or it might be fast within the driven element or perhaps cranked at the right side of Fig. 1, and other features and details of construction are susceptible of considerable modification without departing from the principle of the invention.

Mounted in supports or bearings 1 is an axle or shaft 2 whose front end in the present case carries the power wheel P. The latter is shown as having a long hub or sleeve 3, a hollow body 4, and a rim 5 having a flat face 6 for a belt, although this face could be toothed as suggested above. The body preferably has adjacent said face a radial flange 7, and in rear of said face it is provided with an internal gear 8.

Fixedly supported next behind the power element, as perhaps by having its base 10 connected with a suitable support, is an annular casing or drum 11 which is circumferentially of substantially the same size as said element, and this drum is provided with an internal channel 12 whose front wall forms a shoulder or flange 13 as seen in Fig. 2. Forward of said channel the drum has an internal gear 14, and in rear of the channel it has another internal gear 15. The drum has no heads and is in effect a large ring concentric with the shaft 2, its forward portion carrying the driving mechanism, and its rearward portion the driven mechanism.

Rotatably mounted on the axle or shaft is a disk 20 which stands entirely within the drum and in a plane through its channel 12, and carried by and projecting rigidly forward from this disk at one edge is a stub shaft 21 on which is rotatably mounted the hub of a planetary or revolving pinion 22, a flange 23 thereon engaging the shoulder or flange 13 of the drum. Said pinion is double, its front face having crown teeth 28 engaging the internal gear 8 within the power wheel, and its periphery having spur teeth 29 for a purpose yet to appear. Pivoted to the disk at points 24, preferably on opposite sides of the stub shaft 21 are two arms 25 shaped about as seen in Fig. 4 and extending clear across the face of the disk and overlapping and diverging from each other at their other ends, at which point each arm has a forwardly projecting pin 26 supporting a roller 27.

Loosely mounted within the front end of the drum 11 is a floating or ring gear 30, preferably of the cross section best seen in Fig. 2. That is to say, its body is a flat band having teeth 34 in constant mesh with those of the internal gear 14 at the front of the drum, at the front edge of said band is an inturned flange 32, and at the rear edge thereof is an outturned flange 33 overlying the shoulder or flange 13 of the drum. The entire ring 30 is smaller than the internal gear 14 so that a crescent shaped space is left between them, in which space is located the shaft 21 and the revolving pinion 22. The spur teeth 29 of the latter are shown in this view as engaging the teeth 34 of the ring at the top, and the rollers 27 engage inside said ring at two points near its bottom and are normally forced outward by springs 37 which connect the arms 25 with points 38 on the disk 20 and are preferably located within cavities 39 therein. Thus the floating ring is compelled to maintain an eccentric position within the drum by the constant engagement of the revolving pinion with the ring at one side and the pressure of the rollers within the ring near its other side. The ring also acts as a fulcrum if we consider the pinion 22 a lever, the power being the engagement of its teeth 28 with the power wheel, and the load being its connection through the stub shaft 21 with the disk which it drives.

Mounted in and projecting rearwardly from said disk, preferably at three equidistant points around the main axle, are stub shafts 41 on which are mounted idlers 40. Each of the latter is shown herein as having two gear faces, one being a lantern gear 45 engaged with the internal gear 15 of the drum 11, and the other being a spur gear 42 engaging a driven pinion 43 which is fast on or connected to the hub of the driven element D, herein shown as a pulley 48. Each of these idlers serves also as a lever, the fixed gear 15 being the fulcrum, the stub shaft 41 the power, and the engagement of the gear 42 with the pinion 43 being the load. It is obvious that the relative proportions of the idlers and the driven pinion may be changed to increase or decrease the leverage and therefore the speed of the driven element; and attention is called to the fact that this change at the rear of the structure can be made without taking down the parts and without any adjustment of or attention to those on the interior. While it is not necessary always to have three idlers, they are preferred in order that the rotating disk may be balanced, and the pinion 22 and the arms and rollers at the front side of this disk may also well be proportioned to maintain such balance.

With this construction of parts, when power is applied to the element P, its rotation is imparted through the teeth 8 and 28 to the pinion 22 which rotates on its shaft 21 and simultaneously revolves with the disk 20. The teeth 29 of this pinion engage the teeth of the ring gear 30 at one side of the latter, and the rollers hold the other side of this ring so that its teeth engage the internal gear teeth 14 of the casing, and the result is that the pinion 22 and the ring 30 revolve within such casing and carry the disk with them. The disk in its rotation around the main shaft carries the several idlers 40, and as these revolve they are caused to rotate on their own shafts 41 by the engagement of the teeth 45 with the internal gear 15, the result being that the engagement of their gears 42 with the pinion 43 causes the latter and the driven element D to be rotated at a high rate of speed. Thus the power at P is communicated to the point D and the speed greatly increased, or power could be applied to D and communicated to P at a greatly decreased speed; and the entire gearing is located between these elements, around a single shaft, and within a contour no larger than that of the largest element.

What is claimed as new is:

1. A planetary gearing comprising a power element having an internal gear, a fixed drum having an internal gear, a disk concentrically mounted within the drum, a gear ring eccentrically mounted within the drum and in constant mesh with its gear at one point, a pinion pivoted to the disk at the midlength of the crescent between the drum and ring, the pinion having teeth in mesh with said ring and in mesh with the gear of the power element, and a driven element connected with said disk.

2. A planetary gearing comprising a power element having an internal gear, a fixed drum having an internal gear, a disk concentrically mounted within the drum, a gear ring eccentrically mounted within the drum and in constant mesh with its gear at one point, a pinion pivoted to the disk at the midlength of the crescent between the drum and ring, the pinion having teeth in mesh with said ring and in mesh with the gear of the power element, arms pivoted at one end to said disk, rollers carried by their other ends inside said ring, yielding means swinging the arms to press the rollers outward, and a driven element connected with said disk.

3. A planetary gearing comprising a power element having an internal gear, a fixed drum having an internal gear, a disk rotatably mounted with the drum, a gear ring eccentrically mounted within the drum and in constant mesh with its gear at one point, coacting flanges on the ring and drum, a pinion pivoted to the disk at the midlength of the crescent between the drum and ring, the pinion having teeth in mesh with said ring and with the gear of the power element, yielding means substantially opposite said pinion holding the ring engaged with the gear in the drum, and a driven element connected with said disk.

4. A planetary gearing comprising a shaft, a fixed casing having internal gears at its front and rear ends, a power element coaxial with said shaft and having an internal gear, a disk on the shaft within the casing, an eccentric gear mounted within the casing, a planetary gear carried by the disk and having teeth engaging the internal gear in said power element and teeth engaging the eccentric gear, a series of pins projecting to the rear from the disk around said shaft, idlers thereon engaging the rear gear of the casing, and a driven element on said shaft having a gear engaged by said idlers.

5. A planetary gearing comprising a power element having an internal gear, a fixed drum having an internal gear, a disk within the drum, a gear ring eccentrically mounted within the drum and in constant mesh with its gear at one point, a pinion pivoted to the disk and having teeth in mesh with said ring and in mesh with the gear of the power element, a shaft through the center of the power element, drum, and disk, a driven element mounted on said shaft, a second internal gear within the drum, and an idler pivoted on the disk and engaging said second internal gear and said driven element.

6. A planetary gearing comprising a power element having an internal gear, a fixed drum having an internal gear, a disk concentrically mounted within the drum, a gear ring eccentrically mounted within the drum and in constant mesh with its gear at one point, a planetary pinion pivoted to the disk and in mesh with the ring opposite said point and also in mesh with the gear of the power element, a shaft through the center of the power element, drum, and disk, a pulley mounted on said shaft and having a driven pinion, a second internal gear within the drum, a series of pins projecting from the disk around its center, and a series of idlers mounted on said pins, each having a gear engaging the last-named internal gear and a second gear engaging said driven pinion.

In testimony whereof, I affix my signature, in the presence of two witnesses.

JOHN S. BARNETT.

Witnesses:
  G. I. DAILEY,
  E. M. SHRIVER.